US009644692B2

(12) United States Patent
Zhang

(10) Patent No.: US 9,644,692 B2
(45) Date of Patent: May 9, 2017

(54) ONE-WAY TRANSMISSION STRUCTURE AND ONE-WAY TRANSMISSION METHOD

(76) Inventor: Aaron Zhang, Allendale, NJ (US)

( * ) Notice: Subject to any disclaimer, the term of this patent is extended or adjusted under 35 U.S.C. 154(b) by 1237 days.

(21) Appl. No.: 13/306,145

(22) Filed: Nov. 29, 2011

(65) Prior Publication Data

US 2013/0075223 A1    Mar. 28, 2013

(30) Foreign Application Priority Data

Sep. 22, 2011 (CN) .......................... 2011 1 0282852

(51) Int. Cl.
    *F16D 41/20*     (2006.01)
    *D04G 5/00*     (2006.01)

(52) U.S. Cl.
    CPC ............... *F16D 41/20* (2013.01); *D04G 5/00* (2013.01)

(58) Field of Classification Search
    CPC ........ F16D 41/20; F16D 41/00; F16D 41/203; F16D 41/206; D04G 5/00; B65B 13/26; B65H 69/04
    USPC ......................................................... 289/1.2
    See application file for complete search history.

(56) References Cited

U.S. PATENT DOCUMENTS

| 257,344 | A | * | 5/1882 | Kosinski | ................ F16D 41/20 74/164 |
| 1,662,413 | A | * | 3/1928 | Bright | .................... B25B 13/52 81/65.4 |
| 4,982,522 | A | * | 1/1991 | Norton | .................... F41C 33/00 224/220 |
| 2006/0179806 | A1 | * | 8/2006 | Maier et al. | .................... 56/12.7 |
| 2009/0026236 | A1 | * | 1/2009 | Krause | .......................... 224/264 |

OTHER PUBLICATIONS

Wikipedia contributors, "Prusik," Wikipedia, the Free Encyclopedia, https://en.wikipedia.org/w/index.php?title=Prusik&oldid=658981275 (accessed Jun. 18, 2015).*
Wikipedia contributors, "Cow hitch," Wikipedia, the Free Encyclopedia, https://en.wikipedia.org/w/index.php?title=Cow_hitch&oldid=666187611 (accessed Jun. 18, 2015).*

* cited by examiner

*Primary Examiner* — Terry Chau
(74) *Attorney, Agent, or Firm* — Wang law Firm, Inc.

(57) ABSTRACT

A one-way transmission structure is provided, which includes a sleeve and a rotating shaft passing through the sleeve, where the rotating shaft is fixed in the sleeve through a rope in a suspended manner, a first end of the rope hitches on the rotating shaft and forms a Prusik knot, and a second end of the rope is fastened on a side wall of the sleeve. In the one-way transmission structure, an active portion and a passive portion can be connected flexibly, which has advantages such as a simple structure, a low manufacturing and maintenance cost, and conveniences in mounting and maintenance.

8 Claims, 7 Drawing Sheets

ONE-WAY TRANSMISSION STRUCTURE AND ONE-WAY TRANSMISSION METHOD

BACKGROUND

Technical Field

The present invention relates to a transmission structure and a transmission method, and more particularly to a one-way transmission structure and a one-way transmission method.

Related Art

Currently, a rigid connection structure is generally used between an active portion and a passive portion of a one-way transmission structure. A most common rigid connection structure is a one-way bearing, in which a casing of the one-way bearing generally includes a plurality of shaft rollers, needle rollers, or ball rollers. A shape of a roller seat enables the rollers to roll in one direction only, and a great resisting force is generated in the other direction, so that a so-called "one-way" is achieved during central shaft transmission. Although the one-way transmission of a large force moment is achieved through the rigid structure, a structure of a passive transmission portion thereof is complicated, thereby greatly increasing the mold opening complexity, causing a high manufacturing cost and a great assembly difficulty. During the use, abrasion unavoidably occurs between the rigid active portion and passive portion due to the factors such as friction, and during maintenance, the whole passive portion must be replaced, so the maintenance is difficult and the maintenance cost is high.

SUMMARY

The objectives of the present invention is to overcome the disadvantage in the prior art and provide a one-way transmission structure and a one-way transmission method, so that an active portion and a passive portion can be connected flexibly, which has the advantages such as a simple structure, a low manufacturing and maintenance cost, and conveniences in mounting and maintenance.

The technical solutions for achieving the above objectives are as follows.

A one-way transmission structure of the present invention includes a sleeve and a rotating shaft passing through the sleeve, in which the rotating shaft is fixed in the sleeve through a rope in a suspended manner, a first end of the rope hitches on the rotating shaft and forms a cow hitch, and a second end of the rope is fastened on a side wall of the sleeve.

A bearing is fastened to either of two sides of the sleeve, and the rotating shaft is supported on the bearing.

A plurality of ropes exists, and a first end of each of the plurality of ropes hitches on the rotating shaft and forms a cow hitch in a same direction.

Two ropes exist and are distributed symmetrically.

Four ropes exist and are distributed symmetrically two by two.

A one-way transmission method of the present invention includes:

making a rotating shaft pass through a sleeve, and fixing the rotating shaft in the sleeve in a suspended manner; hitching a first end of the rope on the rotating shaft and forming a cow hitch, and fastening a second end of the rope on a side wall of the sleeve; and ensuring that the rotating shaft obtains a supporting force pointing to an axle center of the rotating shaft;

exerting a driving force on the rotating shaft in a first direction, in which the cow hitch of the rope is in a relaxed state, and the rotating shaft rotates freely in the first direction;

exerting a driving force on the rotating shaft in a second direction, in which the cow hitch of the rope is in a tightened state, and the rotating shaft is restricted to rotate in the second direction.

A plurality of ropes exists, and a first end of each of the plurality of ropes hitches on the rotating shaft and forms a cow hitch in a same direction.

Through the technical solutions of the present invention, the follow beneficial effects can be obtained.

The rotating shaft and the sleeve are connected flexibly through the rope, and the rope is a main wear-and-tear component. When the rope is damaged, only the corresponding rope needs to be replaced and no complicated processes such as mold opening is required, thereby significantly reducing the repair cost. At the same time, the rotating shaft is hitched in the plurality of cow hitches in the same direction, so as to implement one-way transmission of the transmission structure. The rotating shaft passes through an inner circle of the bearing, so as to provide a supporting force for the rotating shaft and meanwhile prevent the rotating shaft from radial deviation that subjects the rope to uneven stress which damages the rope. The bearing is disposed at either of the two sides to ensure that a redundant resisting force is not generated while the rotating shaft is positioned in a radial direction by the bearing, ensuring the stable and normal operation of the system. The one-way transmission structure of the present invention has the advantage such as a simple structure, a low manufacturing and maintenance cost, and conveniences in mounting and maintenance.

BRIEF DESCRIPTION OF THE DRAWINGS

The present invention will become more fully understood from the detailed description given herein below for illustration only, and thus are not limitative of the present invention, and in which.

DETAILED DESCRIPTION

The present invention is further described in the following with reference to the accompanying drawings and specific embodiments.

Figure 1:
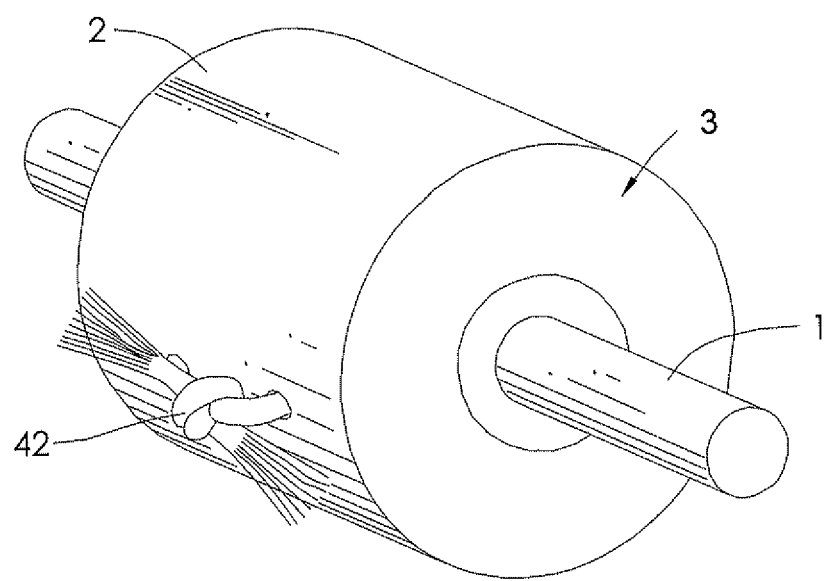
FIG. 1 is a schematic diagram of an overall structure of a one-way transmission structure according to the present invention.
Figure 2:
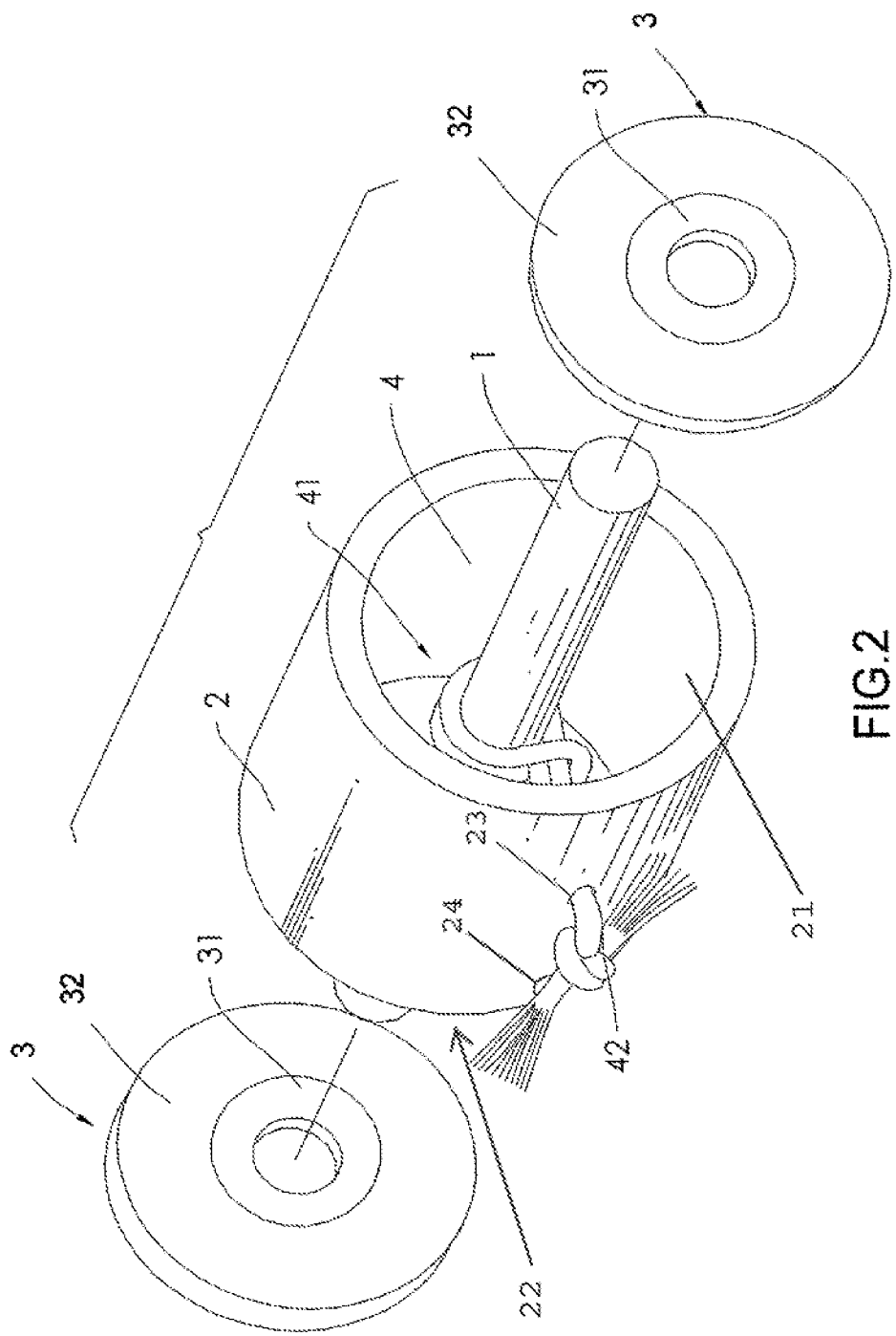
FIG. 2 is a schematic diagram of a mounting structure of a one-way transmission structure using a single rope according to the present invention.

Referring to FIG. 1 and FIG. 2, a one-way transmission structure of the present invention includes a sleeve 2 and a rotating shaft 1 passing through the sleeve 2. The rotating shaft 1 is fixed in the sleeve 2 through a rope 4 in a suspended manner. The sleeve 2 has two opposite openings 21, 22, and two circular passages 23, 24 disposed on the wall of the sleeve 2. A first end of the rope 4 hitches on the rotating shaft 1 and forms a Prusik knot 41, and a second end of the rope 4 is fastened on a side wall of the sleeve 2. A bearing 3 is fastened to either of two sides of the sleeve 2. The rotating shaft 1 is supported on the bearing 3 through an inner circle 31 of the bearing 3. The inner circle 31 of the bearing 3 can rotate with respect to an outer circle 32. When the rotating shaft 1 rotates, the rotating shaft 1 drives the inner circle of the bearing 3 to rotate, and the outer circle of the bearing 3 is static.

Figure 3:
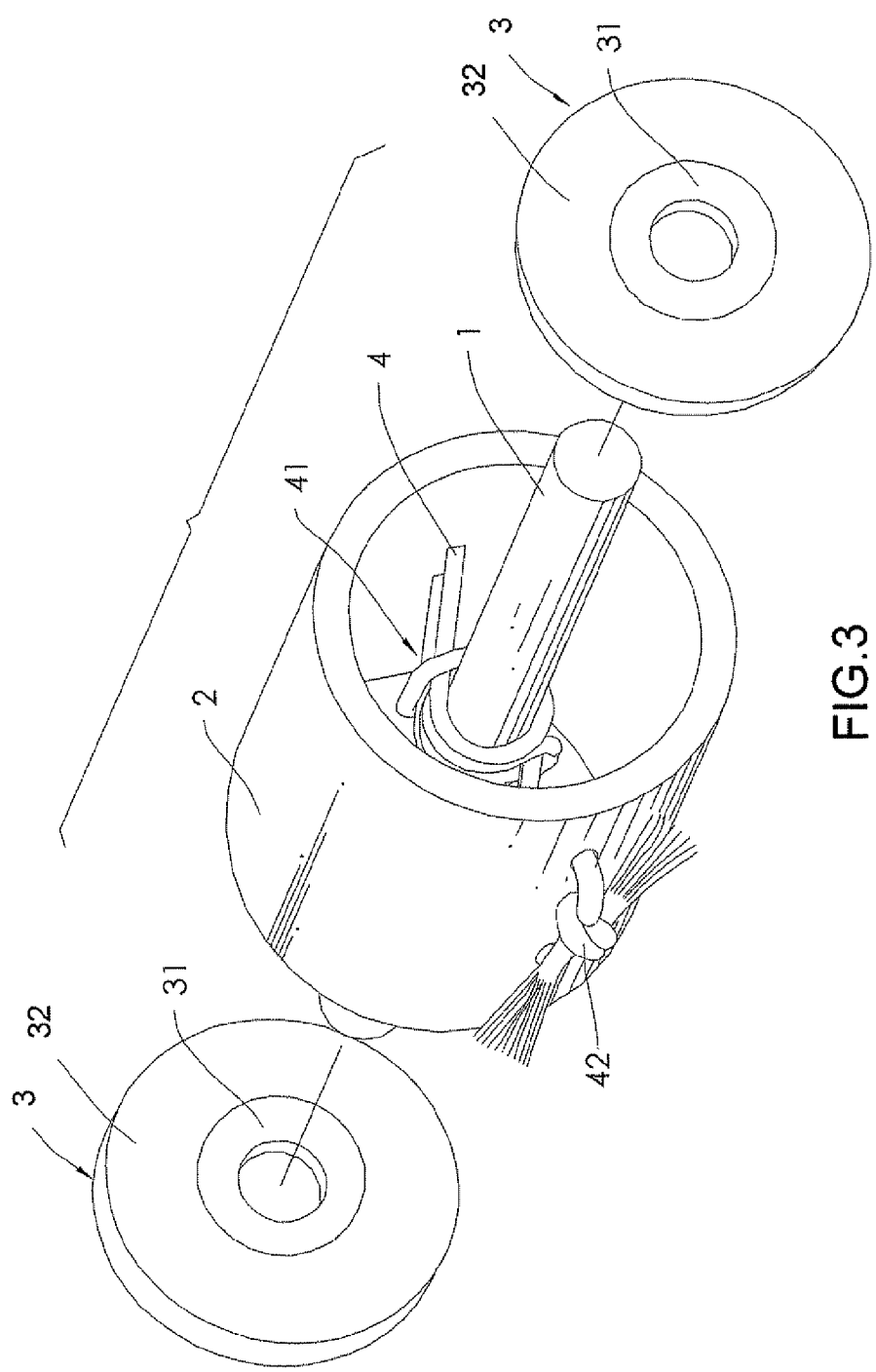
FIG. 3 is a schematic diagram of a mounting structure of a one-way transmission structure using two ropes according to the present invention.

Referring to FIG. 3, when the one-way transmission structure uses two ropes 4, the rotating shaft 1 is fixed in the sleeve 2 through the two symmetrically distributed ropes 4 in a suspended manner. A first end of either of the two ropes 4 hitches on the rotating shaft 1 and forms a cow hitch 41 in a same direction, and a second end of either of the two ropes 4 is fastened on a side wall of the sleeve 2. The rest are the same as the one-way transmission structure using the single rope 1.

Figure 7:
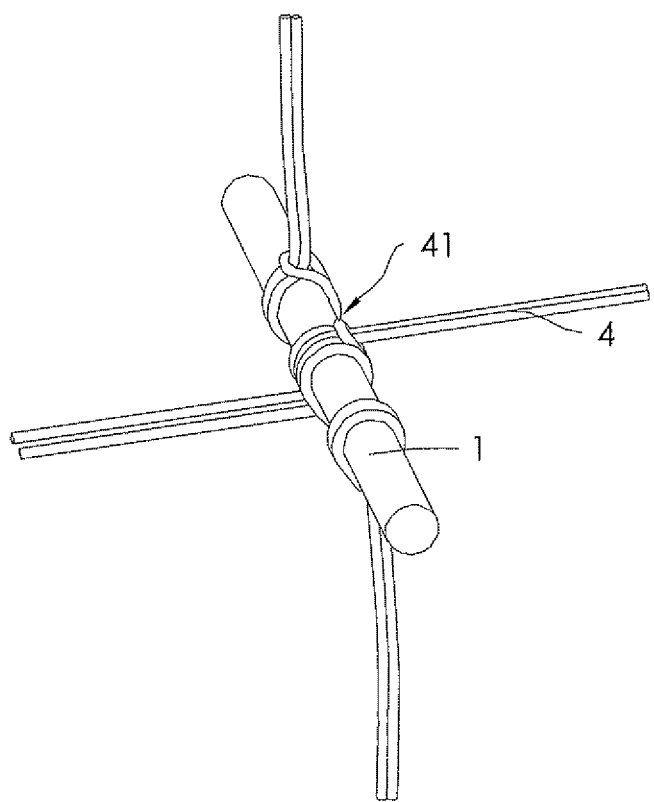
FIG. 7 is a schematic diagram of a mounting structure of a one-way transmission structure using four ropes according to the present invention.
Figure 8:
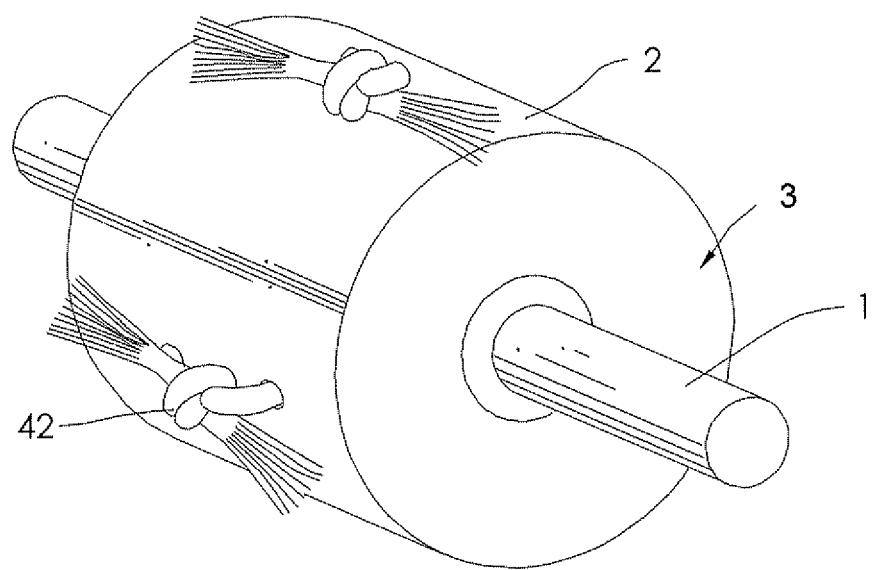
FIG. 8 is a schematic diagram of an overall structure of a one-way transmission structure using four ropes according to the present invention.

Referring to FIG. 7 and FIG. 8, when the one-way transmission structure adopts four ropes 4, the rotating shaft 1 is fixed in the sleeve 2 through the four symmetrically distributed ropes 4 in a suspended manner. A first end of each of the four ropes 4 hitches on the rotating shaft 1 and forms a cow hitch 41 in a same direction, and a second end of each of the four ropes 4 is fastened on a side wall of the sleeve 2. The rest are of the same as the one-way transmission structure using a single rope 1.

A one-way transmission method of the present invention includes the following steps.

Referring to FIG. 2, a rotating shaft 1 passes through a sleeve 2 and is fixed in the sleeve 2 through a rope 4 in a suspended manner. A first end of the rope 4 hitches on the rotating shaft 1 and forms a cow hitch 41, and a second end of the rope 4 is fastened on a side wall of the sleeve 2. A bearing 3 is fastened to each side of the sleeve 2. The bearing 3 includes an outer circle 32 and an inner circle 31 rotatable with respect to the outer circle 32. The rotating shaft 1 is supported on the bearing 3 through the inner circle 31 of the bearing 3 to ensure that the rotating shaft 1 obtains a supporting force pointing to an axle center of the rotating shaft.

Figure 5:
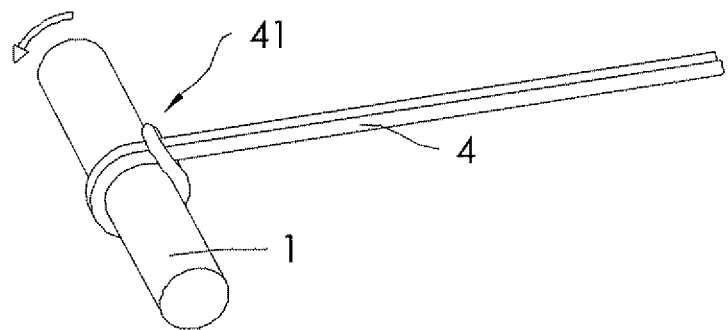
FIG. 5 is a schematic structure diagram of a rotating shaft of a one-way transmission structure subject to a driving force in a first direction according to the present invention.

Referring to FIG. 5, a driving force is exerted on the rotating shaft 1 in a first direction, the cow hitch 41 of the rope 4 is in a relaxed state, and the rotating shaft 1 rotates freely in the first direction.

Figure 6:
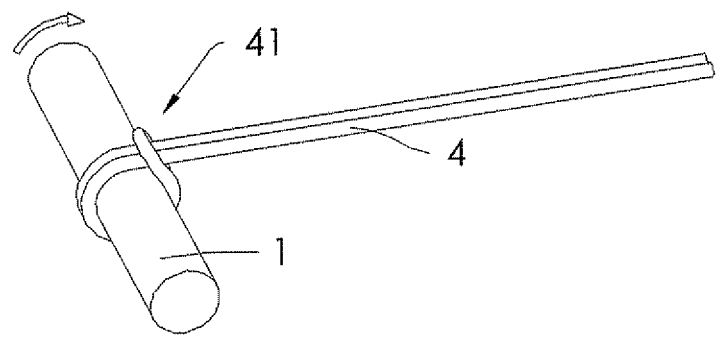
FIG. 6 is a schematic structure diagram of a rotating shaft of a one-way transmission structure subject to a driving force in a second direction according to the present invention.

Referring to FIG. 6, a driving force is exerted on the rotating shaft 1 in a second direction, the cow hitch 41 of the rope 4 is in a tightened state, a static friction state is kept between the rotating shaft 1 and the cow hitch 41 under the effect of the static friction in a direction opposite to the second direction, and the sleeve 2 restricts the rotating shaft 1 through the rope 4 to rotate in the second direction.

Referring to FIG. 3 and FIG. 7, when a plurality of ropes 4 exists, a one-way transmission method using the plurality of ropes 4 differs from the one-way transmission method using the single rope 4 in that, a first end of each of the plurality of ropes 4 hitches on the rotating shaft 1 and forms a cow hitch 41 in a same direction.

Figure 4:
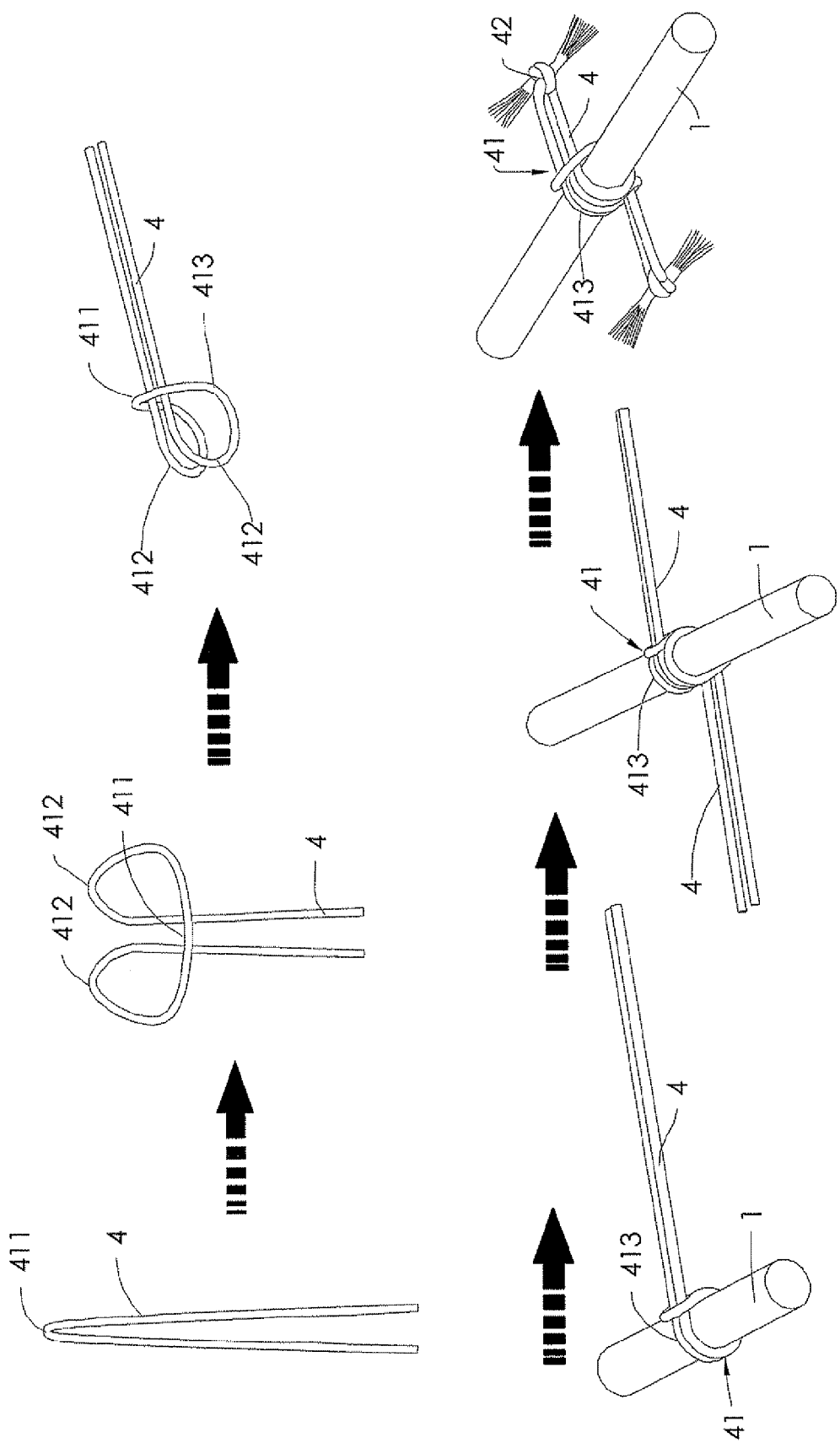
FIG. 4 is a schematic diagram of a hitching process of a cow hitch for a one-way transmission structure and a one-way transmission method according to the present invention.

Referring to FIG. 4, the rope 4 forms the cow hitch 41 and hitches on the rotating shaft 1 through the following steps.

First, the rope 4 is folded by using a middle part of the rope 4 as a first bending point 411. Then, the rope 4 is bent again at a second bending point 412 at a certain distance from the first bending point 411 and is pulled apart to form a loop. Then, the loop is folded along a body of the rope 4 below the second bending point 412 to form a two-layer hitching head 413, and then the rotating shaft 1 passes through the hitching head 413 to complete hitching of the cow hitch 41 of the rope 4. If a plurality of ropes 4 exists, the foregoing steps are repeated on the rotating shaft 1 in the same direction to complete the hitching of a plurality of cow hitches 41. Then, one or more ropes 4 pass through the through holes uniformly distributed on a circumference of the sleeve 2. Finally, the rope 4 is tightened and the rope 4 passing out of the sleeve 2 is tied and fixed to form a knot 42, so that one or more cow hitches 41 of the rope 4 hitches on the rotating shaft 1 and the rotating shaft 1 is fixed in the sleeve 2 in a suspended manner.

In the present invention, the active rotating shaft 1 and the sleeve 2 are connected flexibly through the rope 4, and the rope 4 is a main wear-and-tear component. When the rope 4 is damaged, only the corresponding rope 4 needs to be replaced and complicated processes such as mold opening are no longer required, thereby significantly reducing the maintenance and repair cost. At the same time, the rotating shaft 1 is hitched in the plurality of cow hitches 41 in the same direction, so as to implement one-way transmission of the transmission structure. The rotating shaft 1 passes through the inner circle 31 of the bearing 3, so as to provide a supporting force for the rotating shaft 1 and meanwhile prevent the rotating shaft 1 from radial deviation, and prevent the rope 4 from uneven stress which damages the rope 4. The bearing 3 is disposed at either of the two sides to ensure that a redundant resisting force is not generated while the rotating shaft is positioned in a radial direction by the bearing, thereby ensuring the stable and normal operation of the system. The one-way transmission structure of the present invention has the advantages such as a simple structure, a low manufacturing and maintenance cost, and conveniences in mounting and maintenance.

The present invention is described in detail with reference to the accompanying drawings and embodiments, and various changes can be made by persons of ordinary skills in the art according to the above description. Therefore, some details of the embodiments shall not constitute a limit to the present invention, and the protection scope of the present invention is defined by the appended claims.

What is claimed is:

1. A one-way transmission structure, comprising:
a circular sleeve with a circular wall, a first opening, and a second opening, the circular sleeve having two separate circular passages disposed on the circular wall;
two bearings, one placed on each opening of the circular sleeve;
a rotating shaft, disposed inside the circular sleeve, with two ends extending out of the circular sleeve and through the bearings, the rotating shaft rotating freely in a first circumferential direction and being restricted in a second circumferential direction; and
a rope, with two ends, assembled around the rotating shaft, forming a cow knot, wherein the circular wall is formed from one single piece, the rope suspends the rotating shaft inside the circular sleeve, a first end of the rope passes through a first circular passage of the circular wall, and a second end of the rope passes through a second circular passage of the circular wall, the first end of the rope and the second end of the rope are fastened outside of the circular wall of the circular sleeve.

2. The one-way transmission structure according to claim 1, wherein a rope assembly comprises the rope and a number of ropes in the rope assembly is even.

3. The one-way transmission structure according to claim 2, wherein there are two ropes in the rope assembly to symmetrically securely suspend the rotating shaft in the sleeve in two opposite directions.

4. The one-way transition transmission structure according to claim 3, wherein one of the two bearings has an outer circle and an inner circle rotatable with respect to the outer circle and having the rotating shaft firmly secured therein.

5. The one-way transmission structure according to claim 2, wherein there are four ropes in the rope assembly to symmetrically securely suspend the rotating shaft in the sleeve in two opposite directions.

6. The one-way transition transmission structure according to claim 5, wherein one of the two bearings has an outer circle and an inner circle rotatable with respect to the outer circle and having the rotating shaft firmly secured therein.

7. The one-way transition transmission structure according to claim 2, wherein one of the two bearings has an outer circle and an inner circle rotatable with respect to the outer circle and having the rotating shaft firmly secured therein.

8. The one-way transition transmission structure according to claim 1, wherein one of the two bearings has an outer circle and an inner circle rotatable with respect to the outer circle and having the rotating shaft firmly secured therein.

* * * * *